(12) United States Patent
Lau

(10) Patent No.: US 7,048,289 B2
(45) Date of Patent: May 23, 2006

(54) HUMAN-POWERED VEHICLE

(75) Inventor: James C. K. Lau, Torrance, CA (US)

(73) Assignee: JCL Design Inc., Torrance, CA (US)

( * ) Notice: Subject to any disclaimer, the term of this patent is extended or adjusted under 35 U.S.C. 154(b) by 7 days.

(21) Appl. No.: 10/395,726

(22) Filed: Mar. 24, 2003

(65) Prior Publication Data

US 2004/0188974 A1    Sep. 30, 2004

(51) Int. Cl.
B62M 1/02    (2006.01)
(52) U.S. Cl. .................. 280/252; 280/253; 280/257
(58) Field of Classification Search ............... 280/252, 280/253, 554, 555, 256, 234, 236
See application file for complete search history.

(56) References Cited

U.S. PATENT DOCUMENTS

| | | | | |
|---|---|---|---|---|
| 397,144 | A | 2/1889 | Sams | 280/253 |
| 3,588,144 | A | 6/1971 | Padial | 280/236 |
| 3,880,449 | A * | 4/1975 | Wada | 280/261 |
| 3,979,136 | A | 9/1976 | Lassiere | 280/278 |
| 3,990,717 | A | 11/1976 | Best | 280/278 |
| 4,132,428 | A | 1/1979 | Lassiere | 280/278 |
| 4,182,522 | A | 1/1980 | Ritchie | 280/278 |
| 4,198,072 | A | 4/1980 | Hopkins | 280/267 |
| 4,432,561 | A | 2/1984 | Feikema et al. | 280/282 |
| 4,436,173 | A | 3/1984 | Takahashi | 180/226 |
| D277,744 | S | 2/1985 | Traylor | D12/111 |
| 4,502,705 | A | 3/1985 | Weaver | 280/231 |
| 4,773,662 | A | 9/1988 | Phillips | 280/234 |
| 4,773,663 | A * | 9/1988 | Sawyer et al. | 280/261 |
| 4,789,173 | A | 12/1988 | Lofgren et al. | 280/281 |
| 4,838,568 | A | 6/1989 | Arroyo | 280/234 |
| 5,039,122 | A | 8/1991 | Deutch et al. | 280/234 |
| 5,158,314 | A | 10/1992 | Farras Pinos | 280/259 |
| 5,397,145 | A | 3/1995 | Kobluk | 280/240 |
| 5,486,015 | A | 1/1996 | Lau | 280/236 |
| 5,823,554 | A | 10/1998 | Lau | 280/261 |
| 6,135,904 | A | 10/2000 | Guthrie | |
| 6,716,141 | B1 * | 4/2004 | Bhoopathy | 482/51 |

FOREIGN PATENT DOCUMENTS

| | | | | |
|---|---|---|---|---|
| DE | 3335285 | 2/1984 | | 280/288.1 |
| FR | 2590538 | 5/1987 | | 280/288.1 |
| IT | 0501515 | 11/1954 | | 280/288.1 |
| SU | 1382733 | 3/1988 | | 280/278 |
| SU | 1406024 | 6/1988 | | 280/278 |

OTHER PUBLICATIONS

International Search Report, mailed Feb. 6, 2004, for International Application No. PCT/US03/09004.

* cited by examiner

*Primary Examiner*—Tony Winner
(74) *Attorney, Agent, or Firm*—Kilyk & Bowersox, P.L.L.C.

(57) ABSTRACT

Apparatus and methods are disclosed for a human-powered vehicle. The vehicle can be a two-wheel, recumbent-style vehicle. The vehicle can be readily disassembled for ease of transport.

7 Claims, 11 Drawing Sheets

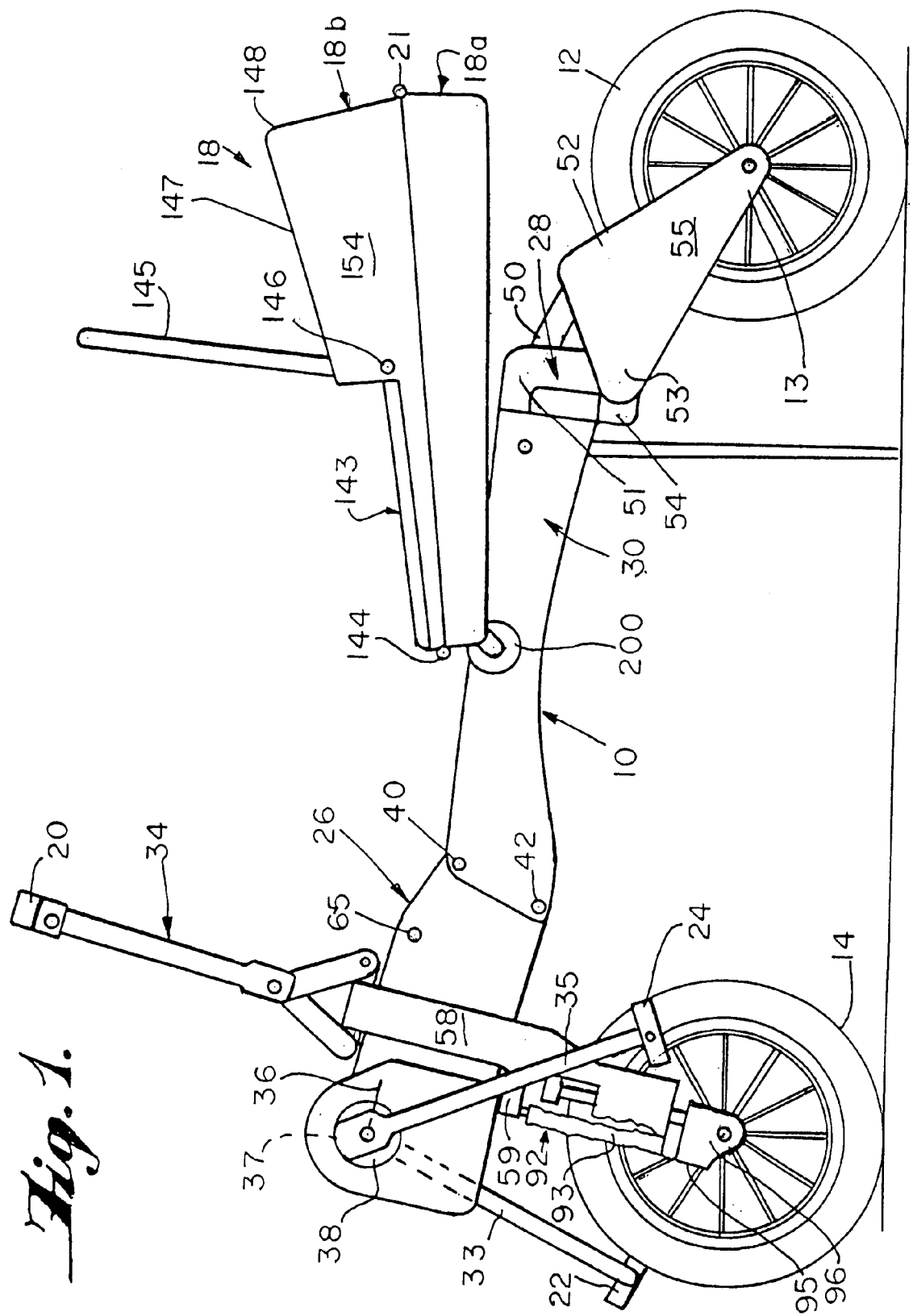

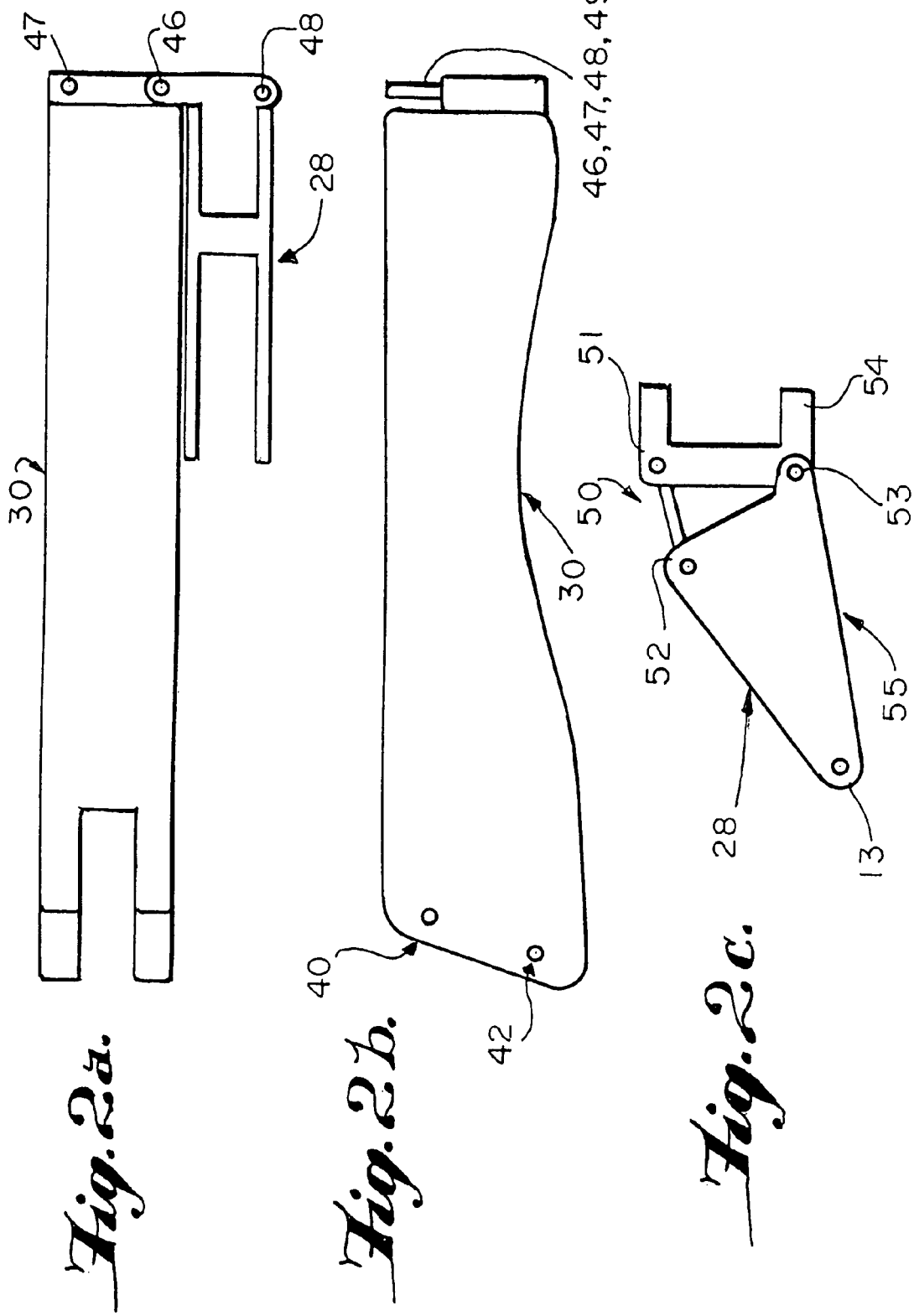

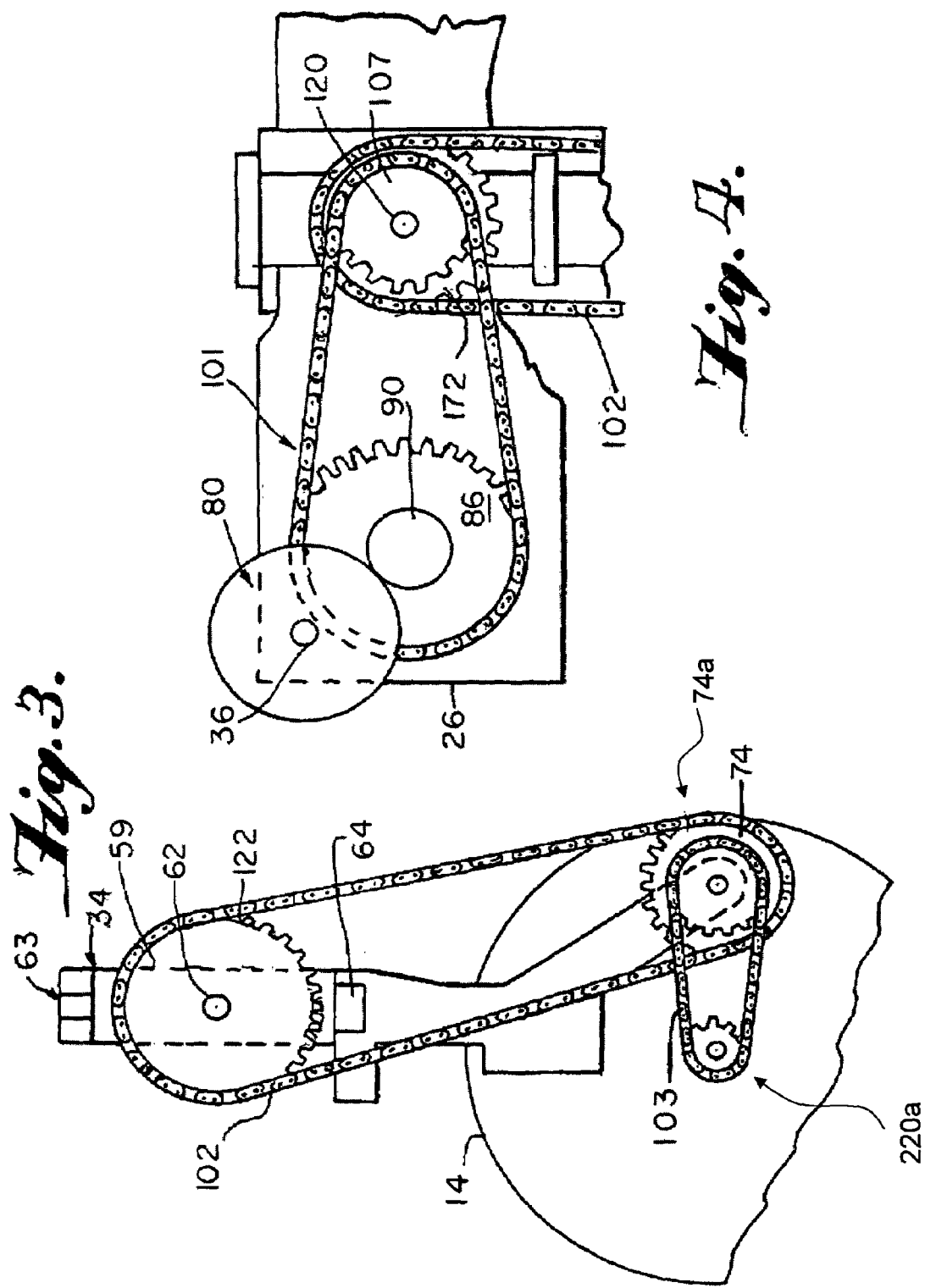

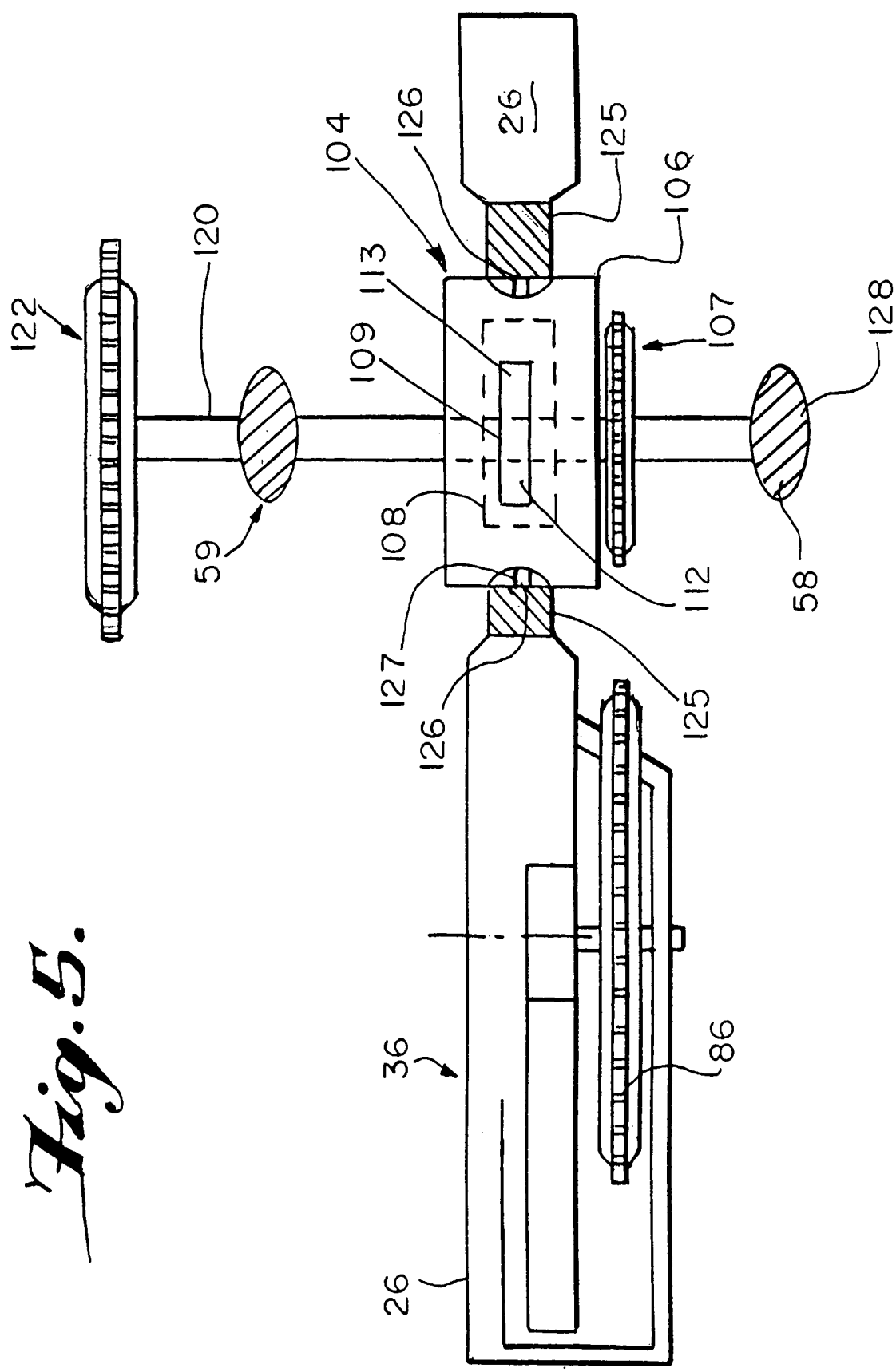

HUMAN-POWERED VEHICLE

FIELD OF THE INVENTION

The present invention relates to human powered ground transportation vehicles having two or more wheels, such as bicycles and the like. More particularly, the present invention relates to a bicycle, or similar vehicle, constructed for convenient manual transformation between an erected operating configuration and a compactly folded position.

BACKGROUND OF THE INVENTION

Today, bicycles enjoy wide recognition and favorable acceptance as a means of transportation. Bicycle design and construction has evolved tremendously over the years, and further evolution will likely continue long into the future. Exemplary of today's recumbent bikes are those shown in U.S. patent application Ser. No. 08/226,898, filed Apr. 13, 1994, now U.S. Pat. No. 5,486,015, and U.S. patent application Ser. No. 08/572,239, filed Dec. 13, 1995, now U.S. Pat. No. 5,823,554, both of which are incorporated herein in their entireties by reference.

In the early days of development, both steering and powering functions for the typical bicycle were carried out via the front wheel. A typical steering arrangement included a handlebar, attached atop a steering column, as a means for operator controlled steering of the vehicle. In this regard, the handlebar/steering column arrangement was designed to rotate in concert with the front wheel. Any manual rotation of the handlebar effected an identical angular rotation of the front wheel. For motion, early systems typically supplied driving power, derived from a rider's leg work, directly to the front wheel. In this regard, the drive systems, generally included a pair of rider engagable foot pedals. One pedal was positioned laterally outward of, and alongside, each outer face of the wheel. Connection means were provided to rigidly attach the pedals at opposing ends of the front wheel axle.

Although effective for certain limited purposes, the early direct drive systems were characterized by various disadvantages. For example, the typical human operator was physically incapable of rotating the front wheel assembly, via the foot pedals, at such a rate (revolutions per minute) as required in order to achieve high vehicle speeds (i.e., more than 15 mph). Further, high speed travel could not be achieved even when such a direct drive system was used in combination with a large-diameter front wheel (e.g., five feet). Another disadvantage, which was characteristic of the early direct drive systems, was incurred due to the rigid attachment of the foot pedals at the front wheel axle. Such attachment required that the pedals rotate about the vehicle's steering axis upon rotation of the front wheel. This characteristic made vehicle steering maneuvers highly cumbersome for the operator.

Subsequent design efforts, aimed at permitting an increase in top vehicle speed without requiring the use of a large-diameter front wheel, eventually lead to the introduction of gears into the vehicle drive system arrangement. Achievable bicycle top speeds increased tremendously as a result. The developed sprocket and the various systems of sprockets, additionally, permitted the foot pedals to be fixed with respect to the vehicle frame instead of at the front wheel axle. Accordingly, the problems due to pedal rotation during steering could be avoided. The great successes enjoyed through the use of sprockets in the various bicycle operational systems prompted still further development efforts. Today, developers continue such efforts to create new and/or improved gears and gear arrangements capable of satisfying a variety of targeted needs and goals.

Numerous and varied additional changes and improvements in bicycle design have been observed over the past century. The typical bicycle of today generally includes a metal frame mounted on two wire-spoked wheels with one behind the other, a seat, handlebars for steering, and a pair of pedals by which it is driven. The majority of present day bicycles are constructed so that steering is accomplished via the forwardly positioned wheel and drive (power) for the vehicle is provided via the rearwardly positioned wheel. The overall length of such arrangements tend to exceed five feet. The vehicle weight is sometimes minimized by utilizing light weight materials, such as aluminum or fiber reinforced resins. Bicycle constructions which employ such materials can achieve vehicle weights as low as 10 pounds.

In spite of the widespread acceptance of bicycles as a means of transportation highly useful for many purposes, riders nevertheless often encounter problems upon reaching a destination point. For example, adequate facilities may not exist at a particular destination for storing the bicycle. Unfortunately, when a bicycle is temporarily parked and left unattended, it often becomes a target for theft and/or vandalism. Another problem can be encountered if the bicycle is used during, or in making, only a limited portion of a trip. In such a situation, the use and/or presence of the bicycle, especially a large and/or heavy one, will not always be desirable. For example, it may become necessary for a rider to carry the bicycle onto a different transportation vehicle for a time (e.g., a bus, van, train, plane, etc.). Such a situation could arise when the only reasonable means available to get to a particular desired location is by way of a common public transportation vehicle, but the rider contemplates a future need to use the bicycle after arriving at the location. It is not only inconvenient to hand carry presently known ordinary bicycles, but also those constructed of very light weight materials. This is due to the fact that many problems arise primarily as a result of vehicle length. Typical vehicle lengths are often equal to, or greater than, average human height. Thus, problems caused merely by the spatial outlay of a vehicle can deter or prohibit a rider from carrying it about and/or stowing it safely away during periods of nonuse (e.g., while at the workplace).

Development efforts, focused at reducing the vehicle carrying configuration length and width, have given rise to bicycle designs incorporating various folding schemes. Although the known folding bicycle designs exhibit a number of differences from the typical features of bicycles, they have all continued to utilize the typical basic steering and power drive arrangement employed with ordinary bicycles. So far, the reductions in carrying configuration size (volume) achieved by the known folding bicycles have not proven sufficient to promote their general recognition and acceptance.

In order to operate a typical bicycle, a force (power) must be imparted by the rider's legs towards the vehicle pedals. Generally, this operating force extends in a substantially vertical direction. Accordingly, the rider usually assumes a riding position which facilitates the application of such force. The usual position assumed by the rider tends to make the overall vehicle/rider height greater than four feet. As a consequence, a large frontal view cross sectional area of the rider's body is exposed which acts as a source of drag.

There is a known bicycle design-type which reduces the frontal cross sectional area exposed by a rider, as compared to that encountered with the more typical bicycle constructions. Such vehicles are known as recumbent bicycles. Recumbent bicycles are designed so that the rider assumes a lay-back position during vehicle operation. Recumbent bicycles have been the predominant design-type used by riders in setting the currently held short distance speed records. Despite their successes, recumbent bicycles are recognized to present certain problems of their own. Recumbent bicycles equipped with typical front wheel steering and back wheel drive require the use of long drive chains which are positioned under the rider. Unfortunately, such drive chains are a potential source of drag since they tend to add to the vehicle height and, thus, to the frontal view cross sectional area.

According to basic mechanical theory and physics, when the direction of the applied force on an object is perpendicular to the direction of travel, no energy (momentum) is transferred. Without the energy/momentum transfer, an object retains its previous state, e.g. stationary or constant linear motion. Mathematically, the energy transfer can be expressed as the product of the force vector, the motion vector, and the cosine of the angle formed. When the force and motion vectors form a perpendicular angle, the product is zero because the cosine of a right angle is zero. The most efficient energy transfer is achieved when the force and motion directions are parallel.

Practically all commercially available bicycles use circular cranks for the riders to pedal the transmission system. With a circular crank, the push force generated by the rider in an upright position on a safety bicycle would be parallel to the pedal motion if the pedal is in front of the pedal rotational axis. Using two pedals, the time that a rider is able to efficiently transfer the pedal force to the crank rotation is approximately one half of the rotation cycle. During the portion of the rotation cycle that efficient power transfer is most difficult, any momentum gained may be partially lost. With a recumbent bicycle, the most efficient power transfer position is different, but the overall efficiency for the pedal cycle is the same.

As can be readily ascertained from the foregoing, various improvements in bicycle design and construction are desirable.

According to various embodiments a human powered ground vehicle can be provided. This vehicle can include a vehicle frame having a forward end and a rearward end and/or a steering column hingedly connected to said vehicle frame and extending across said vehicle frame. The vehicle can also include a motive power input assembly supported by the frame and adapted to derive a motive power from physical exertion of force by a driver. The motive power input assembly can include at least one pedal member adapted to revolve about a laterally extending axis that traverses the vehicle frame through an area located forward of the steering column. The vehicle can also include at least one rear wheel mounted for rotation proximate the rearward end of the vehicle and/or a means for transmitting power from the motive power input assembly to the front wheel, thereby permitting the vehicle to be driven, wherein the means for transmitting power can include a universal joint that can include a first sprocket and a second sprocket, wherein the first sprocket can be rotatably fixed with respect to the vehicle frame and the second sprocket can be pivotable with respect to the first sprocket such that rotation of the first sprocket can cause rotation of the second sprocket. The means for transmitting power can also include a first sprocket assembly that includes at least a third sprocket that can be rotatably fixed with respect to a steering column and/or a drive chain drivingly connecting the second sprocket with the sprocket assembly a second sprocket assembly that can include at least a fourth sprocket fixed with respect to the front wheel and can have a first axis of rotation, wherein the front wheel has a second axis of rotation that is the same as the first axis of rotation. The means for transmitting power can also include a drive chain drivingly connecting the first sprocket assembly to the second sprocket assembly.

The front wheel of the human powered ground vehicle can include an axle. The second axis of rotation can lie along a center line of the axle. The human powered ground vehicle further includes a shock absorber, that has a first end and a second end that is connect to the steering column. The second end can be connected to the wheel. The second sprocket can lie on a second plane, the third sprocket can lie on a third plane, and the fourth sprocket can lie on a fourth plane. The second, third, and fourth planes can be parallel to each other. At least one of the third and fourth sprocket assemblies can include a derailleur system that can include a plurality of sprockets, a guide, and an adjustable chain tensioner.

The human powered vehicle can include a detachable seat that includes a first portion, a second portion, and an interior compartment defined at least in-part by one of the first seat portion and the second seat portion.

According to various embodiments, a method of storing a human powered ground vehicle is provided. The method can include at least one of the steps of: providing a vehicle; separating the seat from the vehicle frame; separating the first seat portion from the second seat portion; folding the vehicle frame to form a folded vehicle frame; placing the folded vehicle frame into the interior compartment; and bringing the first seat portion and the second seat portion together with the folded vehicle frame.

According to various embodiments a human powered ground vehicle, is provided that can include a foldable vehicle frame and a detachable seat. The seat can be detachable from the foldable vehicle frame. The detachable seat can include a first seat portion, a second seat portion, and an interior compartment. The interior compartment can be formed at least in-part by at least one of the first seat portion and the second seat portion. The interior compartment can be of sufficient size and shape to house the foldable vehicle frame when in a folded position. The detachable seat can include at least one roller and/or at least one handle.

According to various embodiments a human powered ground vehicle is provided that can include a reciprocating pedal system that includes at least two roller clutches, a front wheel, a rear wheel, and/or a drive system. The drive system can include two gears a chain and at least two sprockets. The drive system can drivingly connect the reciprocating pedal system and the rear wheel. The drive system can include a derailleur system that includes a plurality of sprockets, a guide, and an adjustable chain tensioner.

SUMMARY OF THE INVENTION

The present invention is adapted to be embodied in a human powered ground vehicle. One feature of the invention comprises a vehicle frame having forward and rearward ends. A steering column is also included which extends across the vehicle frame. Additionally, foot pedals are provided, coupled to the frame, for revolving motion about an axis which traverses the vehicle frame and is located laterally forward of the steering column.

Also, various features of the present invention are adapted to be embodied in both two-wheeled and three-wheeled vehicle constructions. The vehicles can be provided with front wheel steering and front wheel drive. The vehicles can be provided with front wheel steering and rear wheel drive. The vehicles are advantageously foldable between a deployed operating configuration and a compactly folded configuration.

According to various embodiments, a human powered ground vehicle can be provided. The vehicle can include a vehicle frame having a forward end and a rearward end and/or a steering column hingedly connected to said vehicle frame and extending across said vehicle frame. The vehicle can also include a motive power input assembly supported by the frame and adapted to derive a motive power from physical exertion of force by a driver. The motive power input assembly can include at least one pedal member adapted to revolve about a laterally extending axis that traverses the vehicle frame through an area located forward of the steering column. The vehicle can also include at least one rear wheel mounted for rotation proximate the rearward end of the vehicle and/or a means for transmitting power from the motive power input assembly to the front wheel, thereby permitting the vehicle to be driven. The means for transmitting power can include a universal joint that can include a first sprocket and a second sprocket. The first sprocket can be rotatably fixed with respect to the vehicle frame and the second sprocket can be pivotable with respect to the first sprocket. The rotation of the first sprocket can cause rotation of the second sprocket. The means for transmitting power can also include a first sprocket assembly that includes at least a third sprocket that can be rotatably fixed with respect to a steering column. The means can include a drive chain drivingly connecting the second sprocket with the sprocket assembly. The means can include a second sprocket assembly that can include at least a fourth sprocket fixed with respect to the front wheel and can have a first axis of rotation. The front wheel can have a second axis of rotation that is the same as the first axis of rotation. The means for transmitting power can also include a drive chain drivingly connecting the first sprocket assembly to the second sprocket assembly.

According to various embodiments, a method of storing a human powered ground vehicle is provided. The method can include at least one of the steps of: providing a vehicle; separating the seat from the vehicle frame; separating the first seat portion from the second seat portion; folding the vehicle frame to form a folded vehicle frame; placing the folded vehicle frame into the interior compartment; and bringing the first seat portion and the second seat portion together with the folded vehicle frame.

According to various embodiments, a human powered ground vehicle is provided that can include a foldable vehicle frame and a detachable seat. The seat can be detachable from the foldable vehicle frame. The detachable seat can include a first seat portion, a second seat portion, and an interior compartment. The interior compartment can be formed at least in-part by at least one of the first seat portion and the second seat portion. The interior compartment can be of sufficient size and shape to house the foldable vehicle frame when in a folded position.

According to various embodiments, a human powered ground vehicle is provided that can include a reciprocating pedal system that includes at least two roller clutches, a front wheel, a rear wheel, and/or a drive system. The drive system can include a chain and at least two sprockets. The drive system can drivingly connect the reciprocating pedal system and the rear wheel.

Additional features and advantages of the present invention will become clear from the following description.

BRIEF DESCRIPTION OF THE DRAWINGS

The structure and manner of operation of the invention, together with the further objects and advantages thereof, may best be understood by reference to the following description taken in conjunction with the accompanying drawings, in which identical reference numerals identify similar elements, and in which:

FIG. 1 is a side view of a two-wheeled human powered ground vehicle in a fully erected operating configuration according to various embodiments;

FIGS. 2a, 2b, and 2c are top, side, and side views, respectively, showing various features along middle and rearward regions of the vehicle frame structure according to various embodiments;

FIG. 3 is a side view of a drive system to power the front wheel according to various embodiments;

FIG. 4 is a side view of a gear, sprocket, and chain assembly that is adapted to transfer power from a reciprocal pedal assembly to a front drive wheel according to various embodiments;

FIG. 5 is a top plan view of a powered front wheel assembly;

Figures 6A, 6B:
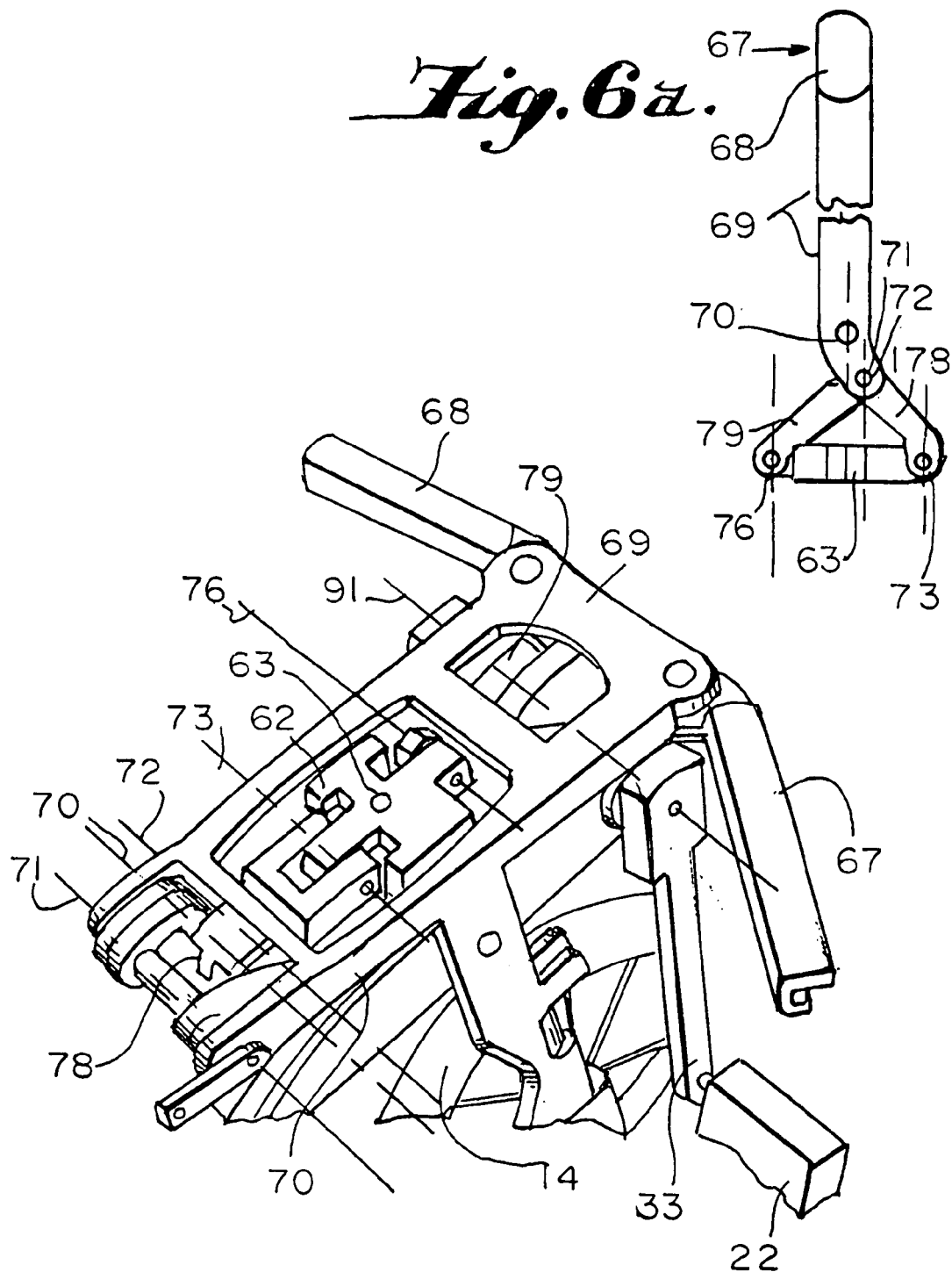
FIGS. 6a and 6b are side and top views, respectively, of a handle bar system in an assembled position and in a stored position, respectively, according to various embodiments.

It is intended that the specification and examples be considered as exemplary only. The true scope and spirit of the present teachings includes various embodiments.

DETAILED DESCRIPTION OF VARIOUS EMBODIMENTS

According to various embodiments, a human powered ground vehicle can be provided. The vehicle can include a vehicle frame having a forward end and a rearward end and/or a steering column hingedly connected to said vehicle frame and extending across said vehicle frame. The vehicle can also include a motive power input assembly supported by the frame and adapted to derive a motive power from physical exertion of force by a driver. The motive power input assembly can include at least one pedal member adapted to revolve about a laterally extending axis that traverses the vehicle frame through an area located forward of the steering column. The vehicle can also include at least one rear wheel mounted for rotation proximate the rearward end of the vehicle and/or a means for transmitting power from the motive power input assembly to the front wheel, thereby permitting the vehicle to be driven. The means for transmitting power can include a universal joint that can include a first sprocket and a second sprocket. The first sprocket can be rotatably fixed with respect to the vehicle frame. The second sprocket can be pivotable with respect to the first sprocket. The rotation of the first sprocket can cause rotation of the second sprocket. The means for transmitting power can also include a first sprocket assembly that includes at least a third sprocket that can be rotatably fixed with respect to a steering column. The means can include a drive chain drivingly connecting the second sprocket with the sprocket assembly. The means can include a second sprocket assembly that can include at least a fourth sprocket fixed with respect to the front wheel and can have a first axis of rotation. The front wheel can have a second axis of rotation that is the same as the first axis of rotation. The means for transmitting power can also include a drive chain drivingly connecting the first sprocket assembly to the second sprocket assembly.

The front wheel of the human powered ground vehicle can include an axle. The second axis of rotation can lie along a center line of the axle. The human powered ground vehicle can include a shock absorber that has a first end and a second end. The first end can be connected to the steering column. The second end can be connected to the wheel. The second sprocket can lie on a second plane, the third sprocket can lie on a third plane, and the fourth sprocket can lie on a fourth plane. The second, third, and fourth planes can be parallel to each other. At least one of the second, third, and fourth sprocket assemblies can include a derailleur system. The derailleur system can include a plurality of sprockets, a guide, and an adjustable chain tensioner.

The human powered vehicle can include a detachable seat that can include a first portion, a second portion, and an interior compartment defined at least in-part by one of the first seat portion and the second seat portion.

According to various embodiments, a method of storing a human powered ground vehicle is provided. The method can include at least one of the steps of: providing a vehicle; separating the seat from the vehicle frame; separating the first seat portion from the second seat portion; folding the vehicle frame to form a folded vehicle frame; placing the folded vehicle frame into the interior compartment; and bringing the first seat portion and the second seat portion together with the folded vehicle frame. To fit the seat portions together to enclose the folded vehicle frame, the seat portions can be fitted together in different ways. For example, a back end of the first seat portion can be fitted to a front end of the second seat portion. For further example, a front end of the first seat portion can be fitted to a front end of the second seat portion.

According to various embodiments, a human powered ground vehicle is provided that can include a foldable vehicle frame and a detachable seat. The seat can be detachable from the foldable vehicle frame. The detachable seat can include a first seat portion, a second seat portion, and an interior compartment. The interior compartment can be formed at least in-part by at least one of the first seat portion and the second seat portion. The interior compartment can be of sufficient size and shape to house the foldable vehicle frame when in a folded position. The detachable seat can include at least one roller and/or at least one handle.

According to various embodiments, a human powered ground vehicle is provided that can include a reciprocating pedal system that includes at least one roller clutch, a front wheel, a rear wheel, and/or a drive system. The drive system can include a chain and at least two sprockets. The drive system can drivingly connect the reciprocating pedal system and the rear wheel. The drive system can include a derailleur system that can include a plurality of sprockets, a guide, and an adjustable chain tensioner.

The following discussion of the preferred embodiments of the present invention is merely exemplary in nature. Accordingly, this discussion is in no way intended to limit the scope of the invention, application of the invention, or the uses of the invention.

Referring initially to FIG. 1, one preferred embodiment of the human powered ground transportation vehicle 10 is shown in side elevational view. The vehicle 10 is provided with two wheels with one wheel 12 positioned behind the other wheel 14. Vehicles of this general type are popularly known (and can herein be referred to) as 'bicycles'.

The bicycle 10 of FIG. 1 is depicted in its fully erected operating configuration. The reference letter "L" is shown as designating a distance of approximately one foot along the vehicle's longitudinal axis. Such length is merely set forth for illustrative purposes and is not intended to be limiting. It should be noted that the present invention contemplates a variety of sizes, shapes, and various dimensions, for a vehicle constructed in accordance with the teachings set forth herein.

Bicycle 10, as illustrated, includes a number of basic components, such as: a frame 16 spanning the distance between the wheels 12, 14; a seat 18 to accommodate a rider in a straddle position; handlebars 20 for steering; and a pair of pedals 22 and 24 (right-side and left-side, respectively) by which it is driven. Briefly, regarding vehicle steering, the present invention employs an arrangement which allows manual turning of the front wheel 14, as desired, via the handlebars 20 and steering column 34 arrangement. With regard to vehicle drive, in accordance with the teachings of this invention, foot power applied to the pedals 22, 24 is transmitted to the front wheel 14 via a gear system and chain arrangement.

Vehicle 10 differs significantly from bicycles in design, structural arrangement, and operation. For example, as noted earlier, the majority of present day bicycles are constructed so that steering is accomplished via a forwardly positioned wheel and drive (power) for the vehicle is provided via a rearwardly positioned wheel. Various embodiments of vehicle 10, on the other hand, are constructed so that both steering and drive are effected via the front wheel 14.

Another difference in the arrangement of bicycle 10, from that of bicycles, involves the spatial relationship between the location of the pedals 22, 24 with respect to the seat 18. As ascertainable from FIG. 1, a rider applies force, appropriate for operating bicycle 10, along a path extending from a region proximate the seat 18 towards the area of the pedals 22, 24. Since various embodiments can provide the pedals 22, 24 at a position along a forward most region of the frame 16, such force follows a diagonal line down towards the vehicle's lower, front end. Thus, the direction of such operational force has a substantial horizontal component. Accordingly, during operation of the vehicle constructed according to various embodiments, the rider is postured low, with reduced overall height. Such placement of the rider aids in minimizing drag. This is in sharp contrast to prior-art bicycles typically having foot pedals positioned beneath the seated rider. As noted earlier, such bicycles require a vertically directed operating force which tends to place the rider in an upright, high drag operating position.

The unique design of the present invention provides an arrangement of elements which not only distinguish the bicycle 10 structurally from most commonly known bicycle constructions, but which also minimize the potential for incurring various inconveniences during efforts in transforming the vehicle 10 between its erected operating configuration and its compactly folded configuration.

It is quite likely that certain important structural features of the present invention, as well as various advantages, are already apparent by way of the discussions and descriptions set forth above. Such features and advantages should become even clearer, and further advantages of the present invention should be easily recognized and understood, upon studying the additional detailed description materials and reading the various accompanying comments which are set forth below.

The frame 16, as illustrated in the embodiment of FIG. 1, is comprised of a plurality of separate and distinct frame sub-components, or sections. Particularly, the frame 16 (as shown) includes a front section 26 located towards the forward end of vehicle 10, a rear section 28 located towards the rearward, or tail, end of vehicle 10, and an intermediate mid-section 30 disposed along a middle region of the vehicle 10 and spanning the distance of space which separates the front and rear sections (26 and 28). Upon properly aligning the sections in series (i.e., front-middle-rear) and appropriately connecting them together, as described more fully below, the sections (26, 28 & 30) are made to perform just as a single, unitary frame.

The distinct sections (26, 28 & 30) of frame 16, are each uniquely adapted to act as means for supporting particular vehicle-related components. Still further, each section (26, 28 & 30) is purposely configured to accomplish and/or allow desirable results and objectives, a number of which are not usually associated with vehicle frames. The structure of FIG. 1 exemplifies plural frame sections (26, 28 & 30) which express such considerations, by design, in construction, and through particular structural arrangement.

As depicted in FIG. 1, the front section 26 of frame 16 can act to support the foot pedals 22, 24, and associated structures. As also shown, each individual pedal 22, 24 is connected at one end of a respective crank arm, or lever, 33 and 35 (right-side and left-side, respectively). The connections are desirably of a type permitting pedal rotation. The pedal connections can be made by inserting a short pivot rod, extending from each pedal (22, 24), into a respective receiving socket formed in each crank arm's outer end region The other end of each crank arm 33, 35, in turn, is attached for sweeping angular motion about a respective axis 36.

The crank arms can be attached at the frame connection points 36 (only one of which is visible in the side view of FIG. 1) in such a way that each pedal and crank arm combination can swing, in a back-and-forth fashion, about its respective axis 36. The axis 36 for each crank arm can be located proximate the vehicle's forward most region and can traverse laterally through the side surfaces of the front frame section 26.

The pedals are connected to the first gear 80 through levers 33, 35 that are attached to roller clutches 37, 38 or devices that would transfer the clockwise pedal rotation to the first gear. The motion of the reciprocal pedal arms can be limited to within 40 degrees from a neutral position. The neutral position is approximately perpendicular to the ground. The pedal motion direction and the applied force direction would be approximately parallel to each other, allowing for high efficiency (greater than 70%) power transfer. The levers 33, 35 can include at least one biasing means that biases the levers in a direction to the rear of the vehicle. The biasing means can be a spring. For example, the biasing means can generate a pressure against at least one of the levers 33, 35 of about three to about five pounds. Both of the levers 33, 35 can move toward the front of the vehicle at the same time. When the levers 33, 35 move toward the front of the vehicle, the wheel 14 rotates in a manner such that a driving wheel can propel the vehicle forward. The roller clutches 37, 38 allow the levers 33, 35 to move toward the rear of the vehicle without interrupting or retarding the forward movement of the vehicle or with minimal interruption or retardation of the forward movement of the vehicle.

The reciprocal pedals can allow the rider to propel the vehicle without substantially changing the height of the rider's feet. In contrast to the circular motion pedal, where the difference between the maximum and minimum feet height is the diameter of the crank (between 12 and 15 inches), the reciprocal pedals allow the difference between the maximum and minimum height to be less than 5 inches. In prior art devices, the large crank diameter forces the short wheel base recumbent bicycle rider to use a lay-down position. The reciprocal pedal design allows the rider to use almost any desirable seating position.

One or more bearings, for example, ball, roller, or mixed, can be used to fix the gear pedal rotation axis. Two bearings separated by a distance of greater than one inch can reduce the bending stress associated with uneven loading with respect to the pedaling action. Two bearings separated by the maximum available distance can be used as much as possible to reduce stress related to bending.

The front section 26 additionally accommodates and provides support for certain other components, which can include: a gear system which forms a part of the vehicle drive system; connection means pertaining to the vehicle steering column arrangement 34; and additional connection means pertaining to an interconnection at the region whereat the forward frame section 26 meets with the middle frame section 30.

FIG. 4 depicts the transmission element around a reciprocal pedal assembly that includes pedals 22, 24 and levers 33, 35. In order to achieve higher power transmission efficiency, a reciprocal pedal assembly, instead of a circular pedal assembly, can be used. To effect the one way rotation of a first gear 80, roller clutches 37, 38 (right and left respectively) are used to make sure that the first gear 80 would only rotate in the clockwise direction (when viewed from the left side of the vehicle) so that the vehicle can be propelled forward by forward movement of the levers 33, 35, and with little or no subsequent retardation of the vehicle's forward movement when levers 33, 35 move back toward the rear of the vehicle. A roller clutch, as used herein, can be contained in a sprocket, wheel, or wheel bearing assembly and can allow a wheel or pedal assembly to spin freely in one direction and move against a gear or wheel in another direction. For example, a peddle assembly, including two pedals, a crank shaft, and a sprocket, can generate power when moved in one direction by locking the crank shaft against the sprocket, while the crank shaft can spin freely in the opposite direction. The first gear 80 is engaged to the second gear 90, which would only rotate in the counter-clockwise direction. The second gear 90 is fixedly attached to a first sprocket 86 so that the second gear 90 and the first sprocket 86 rotate together. With the pedals located below the rotation axis 36, the power stroke is in the clockwise direction. Gear engagement can be an effective method to reverse the direction of rotation such that the two gears 80, 90 are the minimum number necessary for the correct rotation direction. All subsequent power transmission arrangements can be made using chains, which can preserve the direction of rotation. The diameter of the first gear 80 can be greater than the diameter of the second gear so that higher wheel rotation rate can be achieved.

The mid-section 30 of frame 16 is connected to the front section 26 at an upper point 40 and at a lower point 42. Connection points 40, 42 are disposed along a region at which these two frame sections 26, 30 come together. Although any suitable connection device can be employed, the present invention contemplates that one of the points 40, 42 can utilize a pivotable connection means for allowing rotation of one frame section relative to the other. The axis for such rotation can be located at connection point 40. Placement of the rotational pivot axis at connection point 40 offers a very efficient construction for achieving a compact configuration during periods wherein bicycle 10 is folded. By such placement, substantial overlap between the frame sections (26, 30) can be obtained when one frame section is folded around to the other frame section. If rotational point 40, as described, is believed to be a potential source for structural problems in the frame 16, it may be desirable to construct the area as wide as reasonably possible for enhanced frame strength. The structural features and arrangements, as just described, help in providing a construction able to achieve the minimal vehicle folded dimension.

Seat 18 is supported by a section of frame 16, as shown in the embodiment of FIG. 1. While the seat 18 can be attached along the top side of mid-section 30 (as shown), it is nevertheless contemplated herein that it might be desirable in some circumstances to attach the seat 18 atop the rear frame section 28 instead. Any known connector arrangements, as considered suitable by those skilled in the art, may be utilized in effecting attachment of the seat 18 along frame 16. A typical arrangement, contemplated herein, utilizes a rod having one end secured to the seat and the other end held within a receiving socket at the vehicle frame. Such connection means could also provide an arrangement of receptacles useful to facilitate adjustments to seat position between various preset positions. The top side of the mid-section 30 can have equally spaced openings for a seat attachment such that the seat may be attached to different sets of openings and located at the position most appropriate for the rider's leg length.

Seat 18 can also be used as a carrying case. Lower portion 18a of the seat 18 and upper portion 18b of the seat 18 can be connected by hinge 21. The lower portion can include, for example, rollers 141, 142 for moving the folded carry case over paved surface, and fixed and retractable rods for attachment of the seat to the mid-section of the frame. Optionally, alternatively, or in addition to one or more of rollers 141, 142, a roller 200 can be included in the seat/carry case and can further allow for moving the folded vehicle 10 over, for example, a paved or unpaved area. The upper portion 18b can include seating surface 143, which can be attached to the front end of the upper portion 18b using hinge 144, and the back rest 145, which can be adapted to rotate to the position in FIG. 1. In the folded configuration, the back rest 145 can be rotated around axis 146 so that it is flush with and/or temporarily connected to seat surface 143, or back rest 145 can be removed and stored in an interior compartment formed, at least in part, by at least one of upper portion 18b and lower portion 18a. The space behind the back rest 145 can be used for storage space 154 in the operating condition. Hinge 148 can be installed to provide easy access to the storage region 154 through the storage cover 147. Viewing from the side, both the lower and upper portion of the carrying case can have a triangular shape. This shape is chosen so that the full height of the carrying case, for example, about 9 inches, would not be added to the mid-section height for the rider to sit during the operating configuration. The carrying case can have a handle for ease of use. The handle can be placed on the carrying case such that it easy and convenient to roll the carrying case on the ground.

The rear frame section 28 includes suitable structural supports along the rearward vehicle area and accommodates the rear wheel 12. Particularly, rear section 28 provides mounting structure adapted to support the rear wheel 12. In this regard, the rear wheel 12 can be mounted to spin freely about its central axle 13. According to such embodiments, rear wheel 12 is permitted to readily follow front wheel 14 during travel.

The rear section 28 can also include a shock absorber 50 having a first end and a second end. Respective ends of the shock absorber 50 can be connected to the upper part of the rigidly attached rear section 54 at axle 51 and the wheel attachment block 55 at axle 52. The wheel attachment block 55 can also be attached to the lower part of the rigidly attached rear section 28 at axle 53. Through hole 47 in the mid section 30 and through hole 48 in the rear section 28 can be provided to securingly connect the two sections. A sliding element 49 is used to secure 47 to 48 when the two sections are rotate to the operating configuration.

Rear section 28 can be further adapted to be rotated in a fashion to achieve optimal compactness once the bicycle 10 is folded. Such rotation can take place about vertically disposed axes 46 capable of permitting the rear section 28 to swing laterally outward and around. In various embodiments shown in FIG. 1, a single full length sweep (i.e., beginning at one extreme end and continuing until the other extreme end is reached) by the rear section 28 angularly rotates about one hundred eighty degrees. In this way, the rear section 28 can swing over a sufficient angular distance to reach a preferred final position, adjacent to the mid-section 30 and substantially parallel to the general vertical plane of mid-section 30. This construction further helps to ensure that the minimal vehicle folded dimension is achieved.

With additional reference to FIG. 2, details for various embodiments of mid-section 30 and rear section 28 constructions are shown. One side of the means connecting the mid-section 30 to the rear section 28 can include two double hinged joints 46, 47. The other side can contain a sliding element 48. The sliding element 48 can be adapted to be activated by a locking pin 49 that can be rotated about axis 46. The pin 49 is usually locked at its lower position, except during vehicle folding or unfolding. Teeth are provided on sliding element 48 and on lever 49 to achieve a secured lever position. The sliding element is operable to engage hinges 51, 52 which are rotatable about axis 53, 54 at the rear of the frame mid-section 30. The rear section 28 can be formed with a cutaway area 55.

It is contemplated that steel, aluminum, alloys, or fiber reinforced plastic resins can be used to construct frame 16. Of course, any other materials, as considered suitable by those skilled in the art, may be used in the frame construction. Non slip bolts, or other suitable means, are provided in order to secure and maintain the vehicle frame sections in the deployed configuration according to various embodiments. Also, a suitable folded position latch, at point 65, can be provided for securing and maintaining the vehicle in its folded configuration.

A general folding of bicycle 10, to reduce its overall length and height, can be carried out in as follows. Initially, any means positionally interlocking the sections with one another are disengaged from the secured state. To affect the first fold, the frame rear section 28 can be rotated with respect to its associated vertical axes around to the left, thereby permitting the rear section 28 and the mid-section 30 of the frame to ultimately become parallel with one another. The second fold can be affected by rotating the front frame section 26 with respect to its associated horizontal axis so that it achieves a substantial overlap relative to frame mid-section 30. The seat 18, foot pedals 22, 24, and handlebars 20 can be shifted from respective operating positions to stored positions. The folded vehicle 10 can conveniently be hand carried and/or stowed out of the way (e.g., under the seat of a passenger train, bus, van, airplane, or other public transportation means). The folded vehicle 10 can be stored in the carrying case comprised of the upper portion 18*b* and lower portion 18*a* of the seat 18.

In accordance with various embodiments, the front steering column 34 can consist of the front wheel 14 (including the front tire), drive chains 102 and 103, the handlebars 20, and other control devices, not specifically illustrated, such as braking and gear shifting means. The steering column 34 can be connected to the front frame section 26 by way of two (or more) bearings, for example, an upper bearing and a lower bearing. The width of the front frame section 26 is sufficiently reduced along the region proximate the steering column 34 in order to adequately accommodate the steering column 34.

The steering column 34 can be adapted for folding at its top portion. Particular folding and unfolding action can be modified to satisfy different requirements determined according to the rider's body height, and/or any other special preference(s).

The top portion of the steering column can consist of the top plate 62, with rear hinge axis 73, forward hinge axis 76, forward hinge 79, rear hinge 78, upright column 69, and handle grips 67 and 68 (right hand and left hand). The rear hinge 78 and the upright column 69 can be permanently connected at axis 70. The top plate 62 can be permanently attached to the forward and rear hinges at axis 76 and 73, respectively. The rear hinge includes three axes 70, 71, and 72. The upright column includes two axes 70, 71. In the folded position, all elements are at the same level with handle bars 67, 68 on the outside, the upright column 69 inside the handle bar, and the forward hinge 79, rear hinge 78, and the top block 62 in the middle. According to various embodiments, in the assembled configuration, as depicted in FIG. 6, the forward hinge 79 is rotated around axis 76, the rear hinge 78 is rotated around axis 73 so that axis 91, 71, and 72 are aligned and lock to each other. The handle bars can be rotated outward.

The steering column 34 is capable of rotating with respect to the front frame section 26 along an axis of rotation which extends through the center of an upper bearing 63 and through the center of a lower bearing 64. The angular rotation can be limited. For example, the angular rotation can be limited to less than about 35 degrees. It is not anticipated that a rider should likely encounter significant inconvenience from and reasonable limitation.

FIG. 3 shows a link structure for the vehicle 10, indicated generally by the reference numeral 59. Link 59 can be disposed along the wheel 14 and the bearings 63, 64. Link 59 can be constructed and arranged in a fashion to substantially surround the drive system chain 102. The construction and placement of link 59, as described, can provide adequate structural strength with minimized width for the folded vehicle.

As contemplated herein, a ratchet arrangement or roller clutch can be disposed at wheel 14 so that incidental rotation of the front tire may not cause undesirable driving of the chain 103. Chain 103 is shown in driving connection with front wheel sprocket 220 of second sprocket assembly 220*a*, as shown in FIG. 3. Any known arrangement, as may be considered suitable by those skilled in the art, for achieving this purpose can be used.

Commonly, the known bicycle arrangements have foot pedals positioned beneath the rider. Some known bicycle arrangements have foot pedals positioned substantially in front of the rider. Forwardly positioned pedals can be used herein according to various embodiments since they permit placement of the rider in a relatively low position with reduced overall height.

The foot pedals 22, 24, shown in FIG. 1, are adapted to revolve about an axis located forwardly of the steering column 34. Reciprocating action pedals, which sweep back-and-forth, are preferred herein over the well known conventional rotary pedals, since they reduce the necessity of lifting the feet. Nevertheless, rotary pedals are compatible with the teachings of this invention. The pedals, according to the present invention, are separated from one another a sufficient distance (across the bicycle longitudinal centerline) to permit unimpeded rotation of the front wheel.

Human (foot) power is applied to the pedals 22, 24 and causes the respective crank arms 33, 35 to rotate about the axis 36, fixed with respect to the front frame section 26. Crank arms 33, 35 are disposed in mechanical communication with gear 80 for inducing rotation of gear 80 responsive to crank action. In accordance with various embodiments, the power stroke takes place in the clockwise direction. In order to make the rotation of gear 80 follow the direction of the power stroke, a suitable one way ratchet or roller clutch arrangement for permitting only clockwise movement of gear 80 can be employed. The ratchet or roller clutch arrangement utilized should allow each foot pedal to become engaged with the drive mechanism only when the pedal is being pushed forward. During the return stroke, the pedal should be free to slip with respect to the drive gear. By way of such arrangement, human power can be transmitted to the front wheel 14 with the foot pedals 22, 24 moving back and forth along circular arc segments. Any known ratchet arrangement, as considered suitable by those skilled in the art, for accomplishing this objective may be employed with the present invention.

Construction suitable to ensure the desired reciprocating action upon powering pedals 22, 24 is described. Upon pushing one foot pedal forward, the other pedal can retract, move forward, or remain in place, as directed by the rider. Such reciprocating pedal actions can take place together.

Upon pushing pedal 22 forward, the resulting crank arm 33 motion induces gear 80 to rotate in a clockwise direction. Gear 80 is disposed in mechanical communication with gear 90 for inducing rotation of gear 90 responsive to action of gear 80. Gear 80 and gear 90 are operatively arranged so that rotation of gear 90 takes place in the counter clockwise direction. Gear 90, in turn, is disposed in direct mechanical communication with sprocket 86 for inducing rotation of sprocket 86 responsive to action of gear 90. Gear 90 and sprocket 86 can be arranged so that rotation of sprocket 107 takes place in a counterclockwise direction. Gear 90 and sprocket 86 can be fixed such that when gear 90 rotates, sprocket 86 also rotates in the same direction. The gears for use with the invention are preferably made of high strength material, such as steel. Any other material, as considered suitable by those skilled in the art, can be used in the gear constructions.

Figure 7:
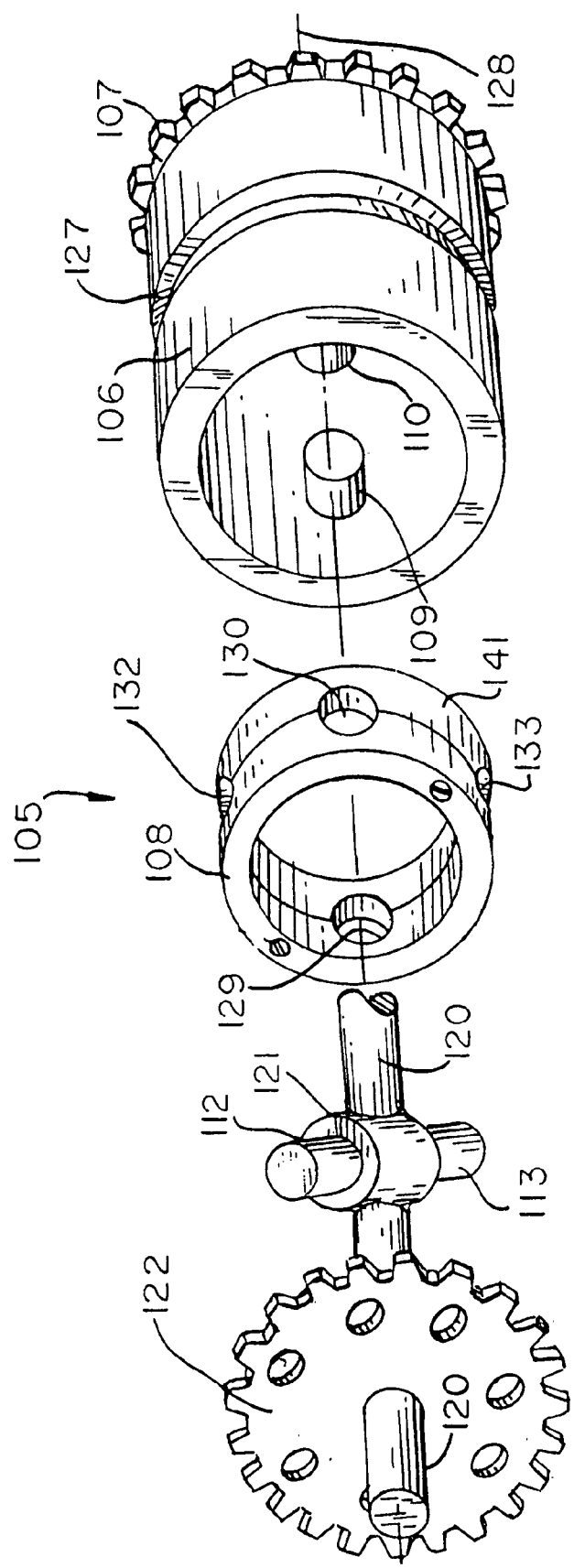
FIG. 7 is an exploded view of a universal joint according to various embodiments.

According to various embodiments, an intermediate power transmitting assembly can comprise a universal joint connection as shown in FIGS. 4 and 7. According to various embodiments of FIGS. 4 and 7, the intermediate power transmitting assembly comprises a gear 106, including first sprocket 107, in mechanical communication with a second sprocket 122 via a universal joint connection which includes a ring member 108. Gear 106 communicates with and is powered by gear 86 of the motive power input assembly by means of chain 101 and sprocket 107. Sprocket 122 communicates with and powers rotatable third chain sprocket of first sprocket assembly 74a (as shown in FIG. 3) of the front wheel by means of chain 102. The universal joint connection shown in FIG. 7 may be directly or indirectly connected to foot pedals for providing a power input.

Gear 106 can be fixedly positioned for rotation in front frame portion 26. A large bore bearing 125 mounted to frame 26 captures gear 106 and prevents movement of the gear, except rotational movement, relative to the frame. The large bore bearing permits rotational movement of gear 106 about axis of rotation 128. An inner annular protrusion 126 of the bearing 125 seats in a corresponding groove or recess 127 formed in the outer surface of gear 106 and can prevent lateral and longitudinal movement of gear 106 relative to the vehicle frame. Bearing 125 can be mounted to frame portion 26 by any of a variety of ways, for example, by screws, adhesives, frictional fit or confining brackets.

Gear 106 includes a sprocket 107 which accommodates chain 101 and enables transmission of power from gear 86 to gear 106. Gear 106 is tubular in shape having a hollow central portion which accommodates a ring member 108 as part of a universal joint connection. While other universal joint connections are considered within the realm of various embodiments, universal joint as shown can be used.

A universal joint connection as shown in FIG. 7 includes gear 106, ring member 108, and sprocket 122 which rotates on axle 120. When a rider is powering the vehicle in a straight forward direction, axle 120 of sprocket 122 rotates about axis of rotation 128 along with gear 106, and sprocket 122 rotates in a plane which lies parallel to the plane of rotation of the front wheel. Thus, no torsional stress is induced on chain 102 as it transmits power from sprocket 122 to sprocket 74 of the front wheel. During turning movements of the vehicle, axle 120 rotates about an axis of rotation which is skewed relative to axis of rotation 128, but sprocket 122 continues to rotate in a plane parallel to the plane of rotation of the front wheel and again no torsional stress is induced on chain 102.

According to various embodiments, at least one sprocket or at least one sprocket assembly can include or can be replaced by a derailleur system having multiple sprockets to adjust the level of resistance required to rotate the driving wheel of the human powered ground vehicle. A derailleur system can include at least two sprockets fixedly connected to one another and an assembly of one or more smaller sprockets, wires, biasing devices, adjustable chain tensioners, and/or guides adapted to move a chain from one sprocket to another. A human powered ground vehicle can include more than one derailleur system. For example, sprocket 122 can be replaced with or can further include multiple sprockets in a sprocket assembly that includes a derailleur system. A derailleur system can be mounted on the wheel 14. A derailleur system can replace sprocket 74.

Front forks 58 and 59, or rigid arms, of the vehicle which are rigidly attached to the front wheel axle (not shown) in a manner which permits rotation of the front wheel on the axle. Axle 120 of sprocket 122 is rigidly attached to forks 58 and 59 on opposite sides or the same side of sprocket 122 in a manner which permits rotation of axle 120. As the steering column 34 rotates about an axis of rotation, the front forks 58 and 59 also rotate about the same axis due to their rigid connection to the steering column. Likewise, axle 120 and sprocket 122 also rotate about the same axis upon rotation of steering column 34 due to the connections between forks 58, 59 and axle 120, and between axle 120 and sprocket 122.

The right fork 59 and left fork 58 of the steering 34 can include spring shock absorbers 92, 93 (right and left). The front wheel can be attached to wheel attachment blocks 95, 96 (right and left). The ends of the shock absorbers can be attached to the fork and the wheel attachment blocks (59 to 95, 58 to 96). Chain 103 can be positioned such that the vertical movement of wheel 14 and the shock absorbers do not interfere with the rotational movement of chain 103, sprocket 74, or fourth sprocket 220 that is rotationally fixed to wheel 14.

The universal joint connection can act as follows. Gear 106 can have two internally protruding bearings 109, 110 formed integrally therewith or otherwise mounted on the internal annular surface of the gear. The bearings can also be introduced through holes extending from the outer surface of gear 106 to the inner surface thereof and held in place by welding, friction fit, adhesives or by other means. Bearings 109, 110 can extend from the inner wall surface of gear 106 into recesses or bores 129, 130, respectively, formed through the outer wall surface of ring member 108. While embodiments can have bores 129 and 130 for receiving bearings 109 and 110, it is to be understood that recesses rather than through-holes may be used to accommodate the bearings.

Sprocket 122 and its axle 120 may be considered part of an intermediate power transmitting assembly which, according to various embodiments can also include ring member 108 and gear 106. Sprocket 122 transfers power from the intermediate power transmitting assembly to sprocket 74 by chain 102. Sprocket 122 can be driven by axle 120, which can be driven by protrusions or bearings 112, 113, which can be driven by ring member 108, which can be driven by gear 106. Thus, as mechanical force is supplied to the motive power input assembly, the force is transmitted through the intermediate power transmitting assembly to the front wheel.

Sprocket 122 can be rigidly connected to axle 120 for rotation therewith. Axle 120 can be rigidly connected to protrusions or bearing 112, 113 so that as bearings 112 and 113 rotate about the axis of rotation of axle 120, they transfer rotational movement to axle 120, which in turn transfers rotational movement to sprocket 122. As shown, axle 120 can be provided with an enlarged portion 121 having a cylindrical opening therethrough of large enough diameter to accommodate bearings 112, 113. According to this embodiment, bearings 112 and 113 are both formed from a single cylindrical piece or rod of metal, such as steel. The rod that constitutes bearings 112, 113 can have an outer diameter which is just barely smaller than the diameter of the cylindrical opening through portion 121. A snug fit of the rod within the opening is thereby provided. The rod can then be welded within the opening to be secured therein, or otherwise adhered, frictionally fit, or deformed. A set screw could also be used to hold the rod in the opening, so long as a rigid connection of the bearings 112, 113 to the axle 120 results. If a very tight fit of the rod in the opening is provided, then it may not be necessary to weld or otherwise subsequently secure the rod. Alternatively, no enlarged portion of the axle may be needed if bearings 112 and 113 are welded directly to axle 120, or formed integral therewith, or otherwise rigidly connected to the axle.

The rotation of bearings 1 12 and 113 can be driven by rotation of ring member 108, which can be in turn driven by rotation of gear 106. Bearings 112 and 113 can be seated in recesses or bore holes 132, 133, respectively, in ring member 108. Although various embodiments of shows reference numerals 132 and 133 as through-holes extending completely through the wall of ring member 108, it is to be understood that recesses can be used instead of through-holes to accommodate the bearings.

The relationship between bearings 112, 113 and bore holes 132, 133, respectively, is such that the bearings can be confined in the bore holes but can be held within the holes loosely enough to permit pivoting movement of the bearings. The bearings 112, 113, and thus axle 120, can be permitted to pivot about an axis which is defined as running through the centers of both bearings 112 and 113 and substantially perpendicular to axle 120. Likewise, bearings 109, 110 can be confined in bore holes 129, 130, respectively, but are held loosely enough to permit pivoting movement of ring member 108 on the bearings. The ring member 108 can be thus permitted to pivot about an axis which is defined as running through the centers of both bearings 109, 110 and through the centers of bore holes 129, 130. The result is a universal joint connection that permits efficient transmission of power from the motive power input assembly to the front wheel even through an angled relationship between the two can exist during turning motions. According to various embodiments, boreholes 129, 130, 132, 133 can be much larger than bearings 109, 110, 112, 113, respectively, and sleeve bearings, bushings, needle roller bearings, or other anti-friction devices can be provided between the bearings and boreholes.

In various embodiments, the diameter of axle 120 can be greater than the diameters of bearings 112, 113 thus permitting more power in less volume than if the diameter of axle 120 were smaller than the diameters of bearings 112, 113. A larger diameter of axle 120 can also be necessary if the bearings 112, 113 are provided as a single rod extending through the axle.

For construction of the universal joint connection, one method of assembly can involve providing the ring member in more than one piece, for example, in two halves. Ring member 108 can comprise two halves 140, 141 that can be held together by screws 142. The ring member may not have to be separated into halves if bearings 109, 110 are pressed through the wall of gear 106 and straight into bore holes 129, 130, respectively. However, one or more removable sections of the ring member can be provided to allow bearings 112, 113 access to bore holes 132, 133, respectively.

If bearings 112, 113 are provided as a single rod which extends through the opening in portion 121, it is possible, e.g., to insert the axle 120 through ring member 108 and then insert the rod through borehole 132, through the opening in axle portion 121, and then through borehole 133, without disassembling the ring member. Bearings 109 and 110 can also be inserted into their respective boreholes without disassembling ring member 108 if bearings 109, 110 are pushed through holes in gear 106. Thus, it is possible to provide ring member 108 as a single piece which requires no assembly or disassembly.

It should be noted that both the two-wheel and three-wheel embodiments can be constructed utilizing various embodiments.

The vehicle frame sections described above could be made by machining aluminum materials (e.g., blocks) to the described configurations. Of course, it is desirable to use a low-cost production technique, appropriate for the chosen materials, in constructing the vehicle of the present invention. Casting, stamping, and stamp bending and/or welding are contemplated as suitable production techniques. Stamping may be appropriate for plastic structural elements utilized in the invention. Any other production technique(s), as contemplated by the skilled artisan, for achieving the invention may be employed.

Figure 8:
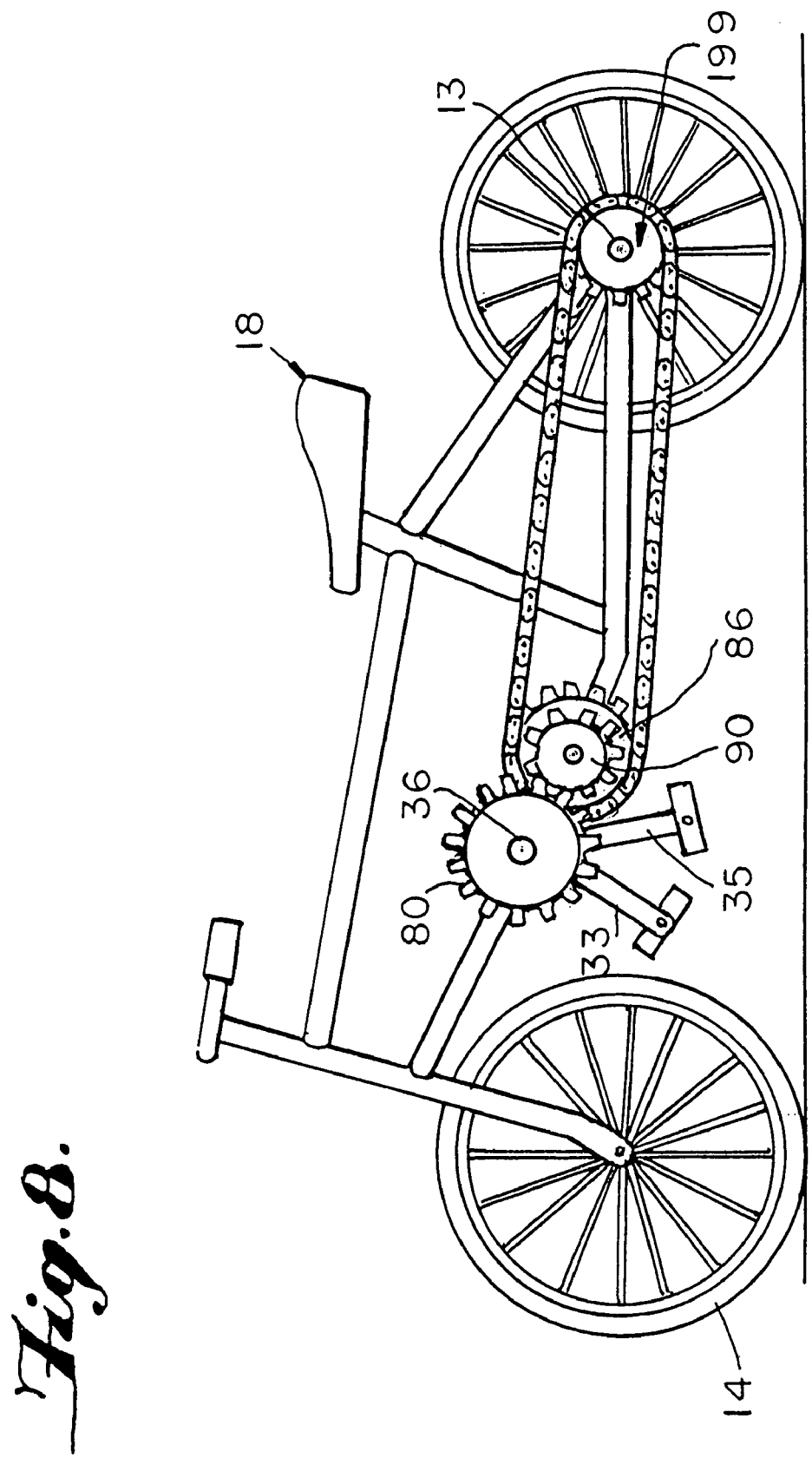
FIG. 8 is a side view of a human powered ground vehicle having a reciprocal pedal assembly and a powered rear wheel according to various embodiments.

According to various embodiments, a human powered ground vehicle having a reciprocal pedal assembly and rear wheel drive can be provided. FIG. 8 shows levers 33, 35 drivingly connected to gear 80 through an axle 36 that includes a roller clutch or ratchet system. Gear 80 is drivingly connected to gear 90 such that when gear 80 rotates in a clockwise direction, gear 90 rotates in a counter-clockwise direction. Gear 90 is fixed to sprocket 86 such that when gear 90 rotates, sprocket 86 also rotates in the same direction. Sprocket 86 can be drivingly connected to rear wheel 12 through an axle 13 and one or more sprockets 199. Sprocket 86 and/or sprocket 199 can be replaced with a derailleur system having, for example, more than one sprocket, a chain guide, and an adjustable chain tensioner. Wheel 12 or axle 13 can have a roller clutch or other ratchet device than can allow power to be transferred when the axle or wheel is rotated in one direction but not when rotated in the other direction, e.g., freewheeling.

Figure 9:
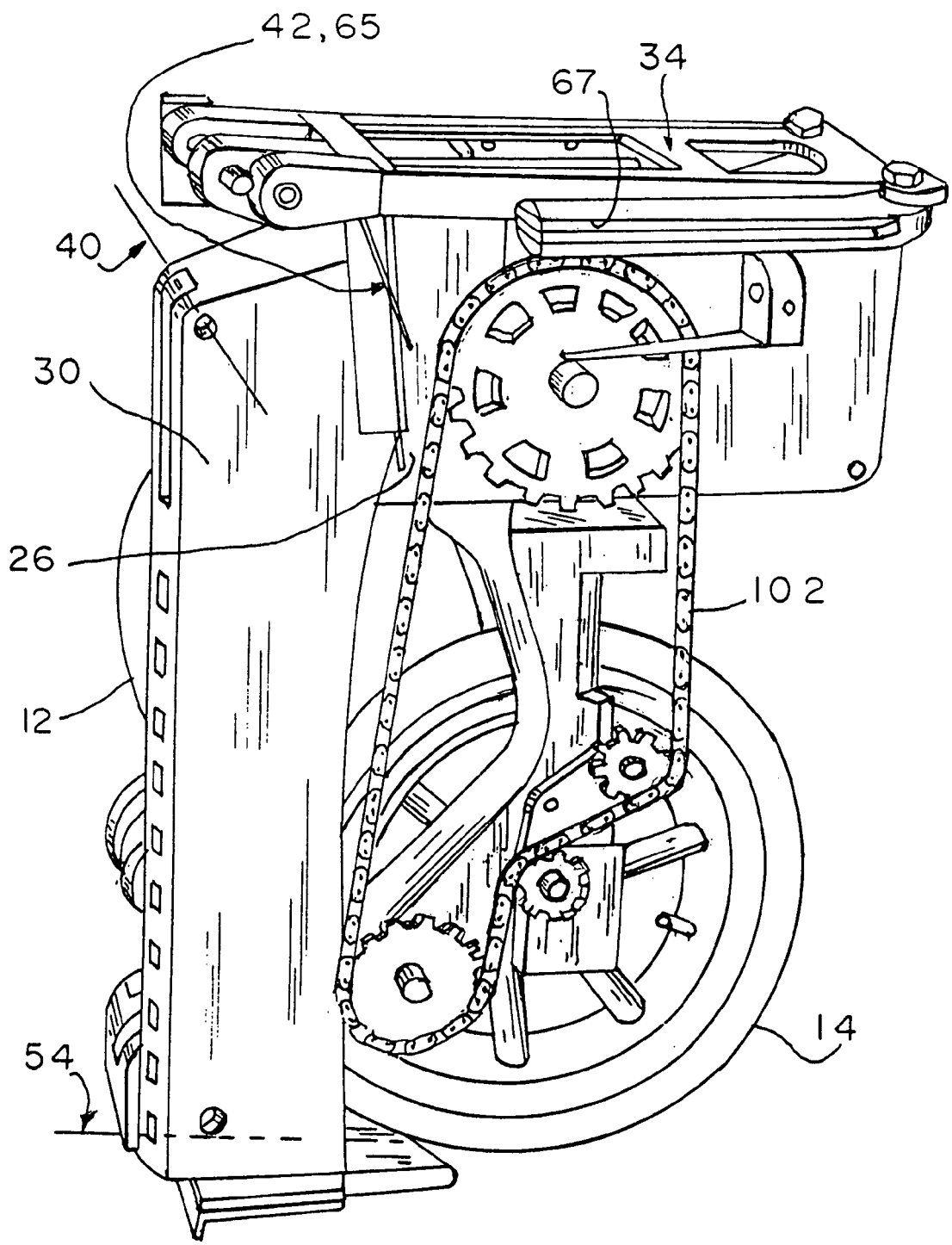
FIG. 9 is a perspective view of a human powered ground vehicle in a folded position according to various embodiments.
Figure 10:
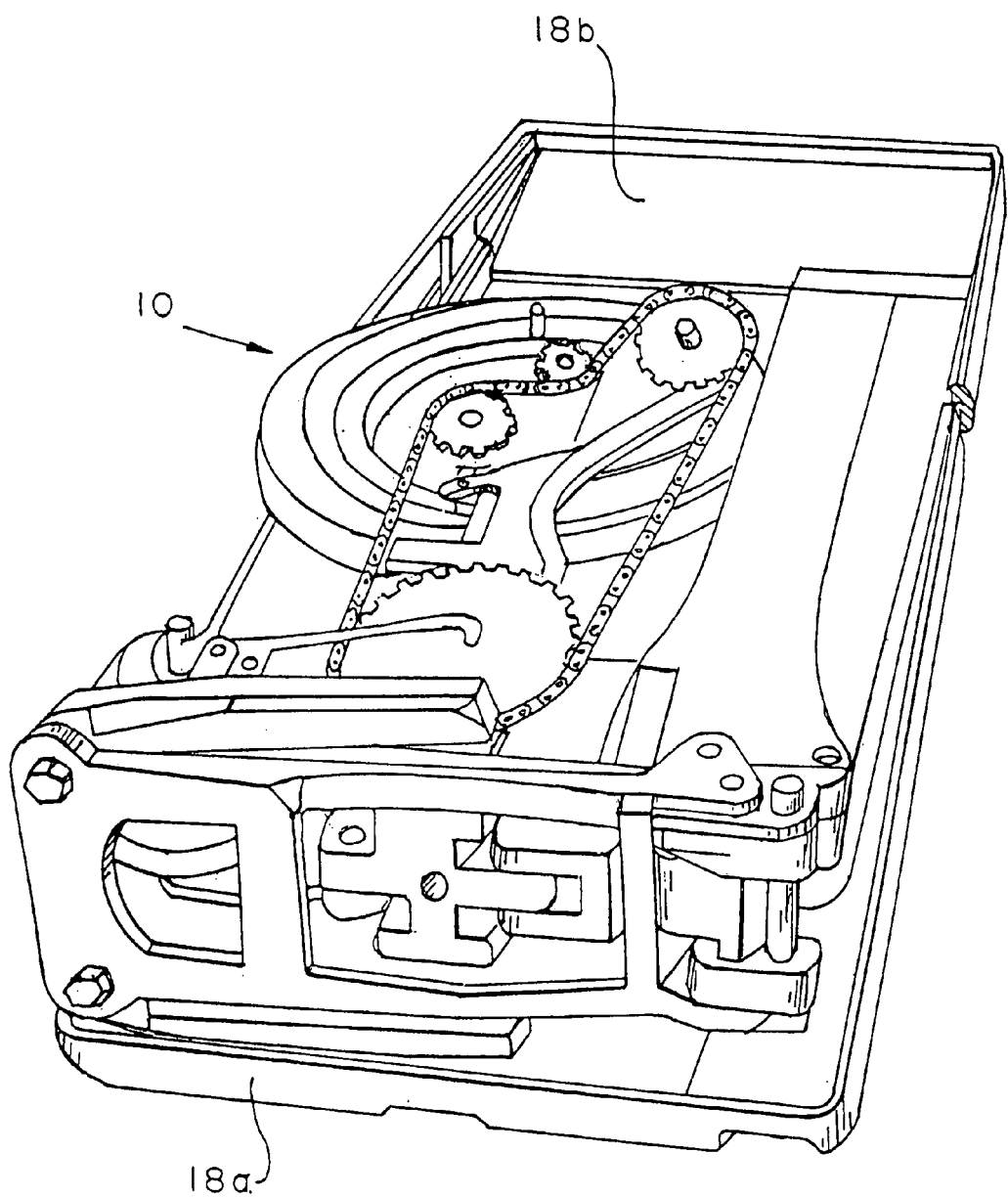
FIG. 10. is a perspective view of a folded human powered ground vehicle inside one of the two seat portions according to various embodiments.

FIG. 9 is a perspective view of the vehicle when folded. The vehicle frame has been folded along axis 40 toward the front of the vehicle and along axis 54 toward the rear of the vehicle. Axes 42 and 65 align when the vehicle frame is completely folded around axis 40. According to various embodiments, the pedals (not shown) and lever arms (not shown) can be removed prior to folding the vehicle. FIG. 10 is a perspective view of the folded vehicle 10 placed in seat portion 18a. Seat portion 18b can be fit over the vehicle 10 and mate with seat portion 18a to securely hold vehicle 10 in a carrying case formed by seat portions 18a and 18b.

Figure 11:
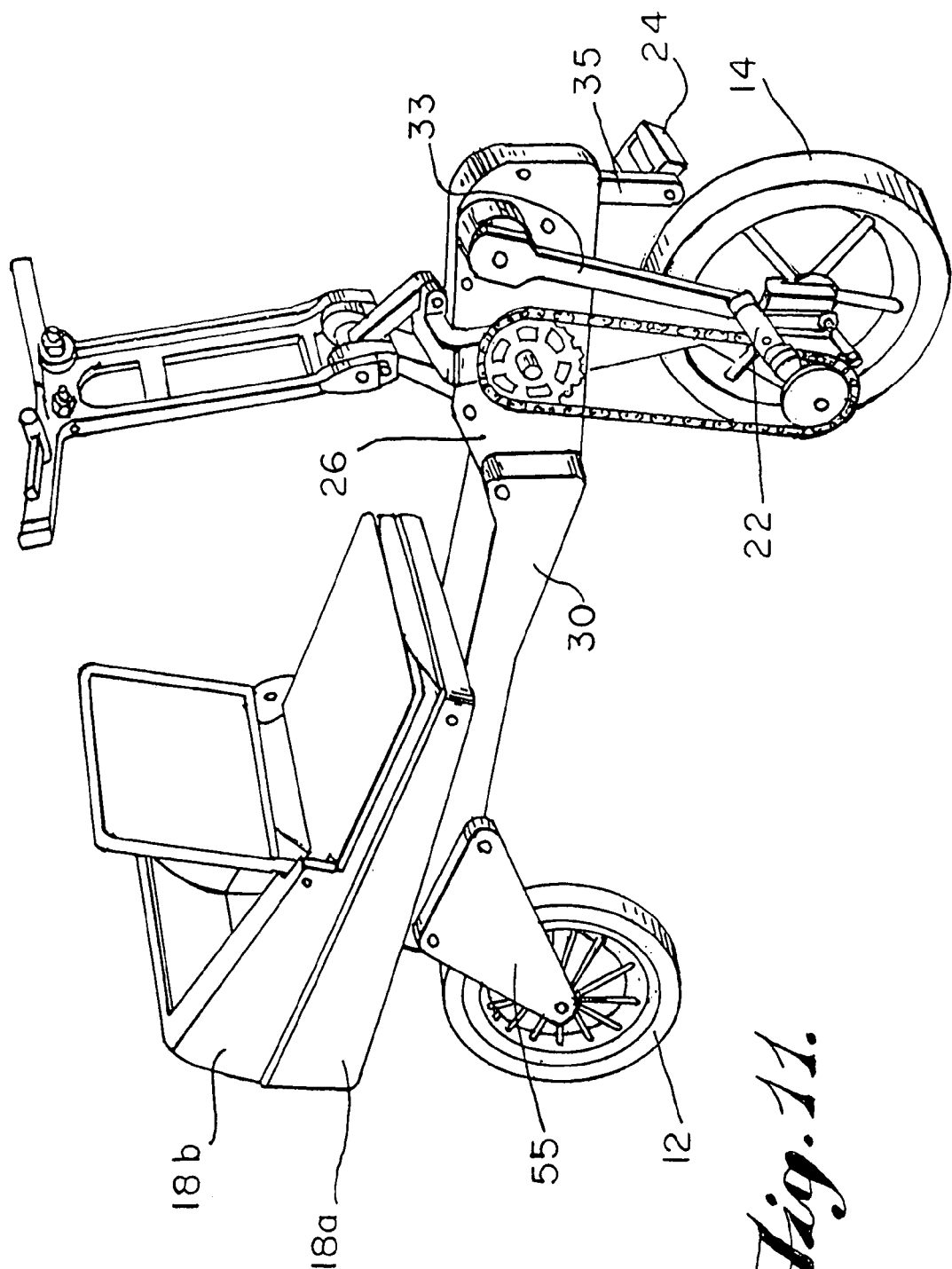
FIG. 11 is a perspective view of a human powered ground vehicle according to various embodiments.

FIG. 11 is a perspective view of a human powered ground vehicle according to various embodiments. The vehicle has a reciprocal pedal system, including pedals 22, 24 and lever arms 33, 35, and a universal joint system (not shown) drivingly connected to the front wheel 14.

Figure 12:
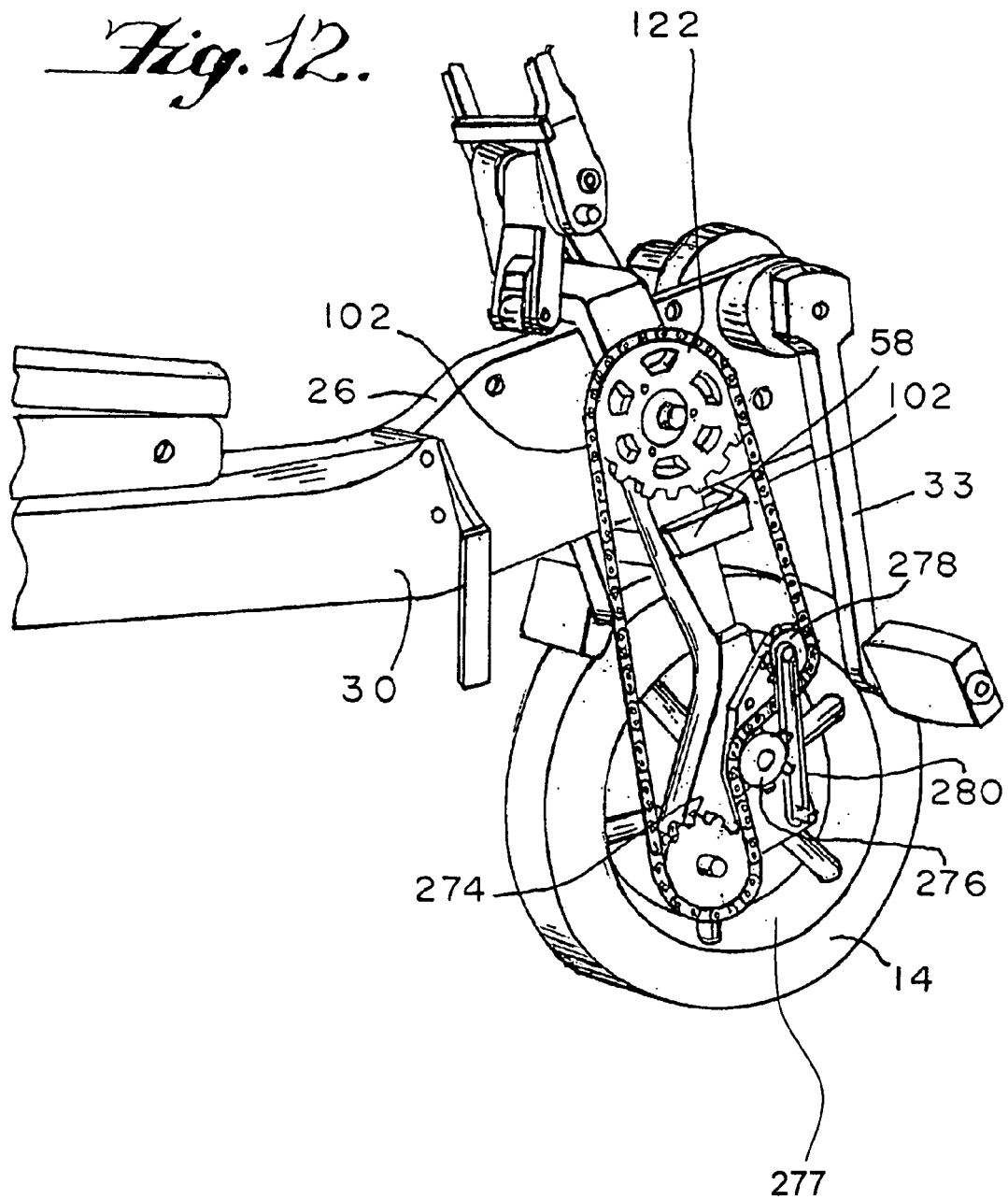
FIG. 12 is a perspective view of a front drive assembly, including a derailleur system, according to various embodiments.

FIG. 12 is a perspective view of a front end of a human powered ground vehicle according to various embodiments. Sprocket 122 is fixed with respect to front fork 58. Sprocket 122 is drivingly connected to a plurality of sprockets 274 via chain 102. A plurality of sprockets 274 is part of a derailleur system 277 that include sprockets 276, 278 and chain tensioner 280. A biasing device or chain guide (not shown) can move chain 102 between any of the plurality of sprockets 274. Sprockets 276, 278 and chain tensioner 280 can serve to keep chain 102 free of unnecessary slack when chain 102 is on any of the plurality of sprockets 274. A chain (not shown) drivingly connects the plurality of sprockets 274 to the front wheel 14.

While a human powered ground vehicle has been described herein with two roller clutches, a human powered ground vehicle can be constructed having, for example, one roller clutch or having three roller or more clutches.

It is contemplated that selective material removal, for a vehicle constructed according to the present teachings, at positions not essential to structural integrity or vehicle operation, can advantageously reduce vehicle weight. Vehicle weights of less than 20 pounds can be possible.

The vehicle is operated in the deployed configuration, as shown in FIG. 1. The following steps can be followed for converting from the vehicle's compactly folded position to its deployed operational configuration:

1. Open the carry case and remove the folded vehicle;
2. The frame's front section can be rotated with respect to the mid-section, and the lever (lock) can be secured;
3. The rear segment can be rotated with respect to the rest of the frame, and the lock screws can be tightened;
4. The top portion of the steering column and the handlebars can be unfolded;
5. The foot pedals can be attached by inserting the rod ends into receiving sockets in the crank arms; and,
6. The seat can be attached and adjusted to the desired position.

The reverse process can be used to fold the vehicle.

Those skilled in the art can now appreciate from the foregoing description that the broad teachings can be implemented in a variety of forms. Therefore, while this invention has been described in connection with particular embodiments and examples thereof, the true scope of the teachings should not be so limited. Various changes and modifications may be made without departing from the scope of the claimed invention.

What is claimed is:

1. A human powered ground vehicle comprising:
   a vehicle frame having a forward end and a rearward end;
   a steering column hingedly connected to said vehicle frame and extending across said vehicle frame;
   a motive power input assembly supported by said frame and adapted to derive a motive power from physical exertion of force by a driver, said motive power input assembly including at least one pedal member adapted to revolve about a laterally extending axis that traverses said vehicle frame through an area located forward of said steering column;
   at least one rear wheel mounted for rotation proximate said rearward end of said vehicle; and
   means for transmitting power from said motive power input assembly to said front wheel, thereby permitting said vehicle to be driven, wherein said means for transmitting power includes:
      a universal joint that includes a first sprocket and a second sprocket, wherein the first sprocket is rotatably fixed with respect to the vehicle frame and the second sprocket is pivotable with respect to the first sprocket such that rotation of the first sprocket causes rotation of the second sprocket;
      a first sprocket assembly including at least a third sprocket that is rotatably fixed with respect to a steering column;
      a drive chain drivingly connecting the second sprocket with the sprocket assembly;
      a second sprocket assembly including at least a fourth sprocket fixed with respect to the front wheel and having a first axis of rotation, wherein the front wheel has a second axis of rotation that is the same as the first axis of rotation; and
      a drive chain drivingly connecting the first sprocket assembly to the second sprocket assembly.

2. The human powered ground vehicle of claim 1, wherein the front wheel includes an axle and the second axis of rotation lies along a center line of the axle, and wherein the human powered ground vehicle further comprises a shock absorber, having a first end and a second end, further wherein the first end is connected to the steering column and the second end is connected to the wheel.

3. The human powered ground vehicle of claim 1, wherein the second sprocket lies on a second plane, the third sprocket lies on a third plane, and the fourth sprocket lies on a fourth plane, wherein the second, third, and fourth planes are parallel to each other.

4. The human powered ground vehicle of claim 1, wherein at least one of the first and second sprocket assemblies includes a derailleur system that includes a plurality of sprockets, and an adjustable chain tensioner.

5. The human powered vehicle of claim 1, further comprising a detachable seat that includes a first portion, a second portion, and an interior compartment defined at least in-part by one of the first seat portion and the second seat portion.

6. The human powered ground vehicle of claim 5, wherein the vehicle frame can have an operable position and a stored position, further wherein the frame is folded along at least one axis when in the stored position.

7. A method of storing a human powered ground vehicle, comprising:
   providing the vehicle of claim 5;
   separating the seat from the vehicle frame;
   separating the first seat portion from the second seat portion;
   folding the vehicle frame to form a folded vehicle frame;
   placing the folded vehicle frame into the interior compartment; and
   bringing the first seat portion and the second seat portion together with the folded vehicle frame.

* * * * *